Jan. 8, 1952 W. W. CUSHMAN 2,581,364
DRUM HANDLING ATTACHMENT FOR INDUSTRIAL TRUCKS
Filed Aug. 2, 1946 3 Sheets-Sheet 2
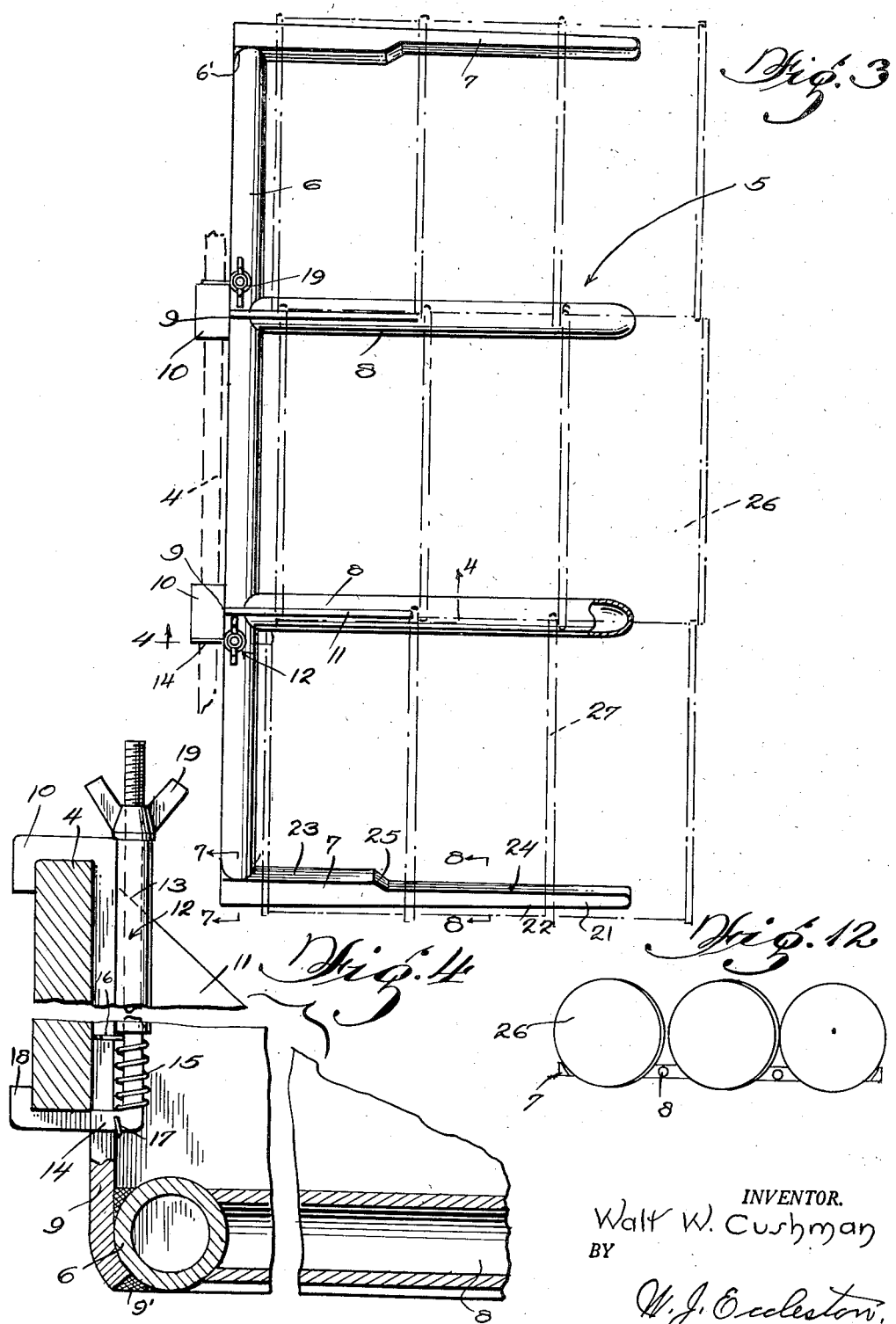
INVENTOR.
Walt W. Cushman
BY
W. J. Eccleston
ATTORNEY

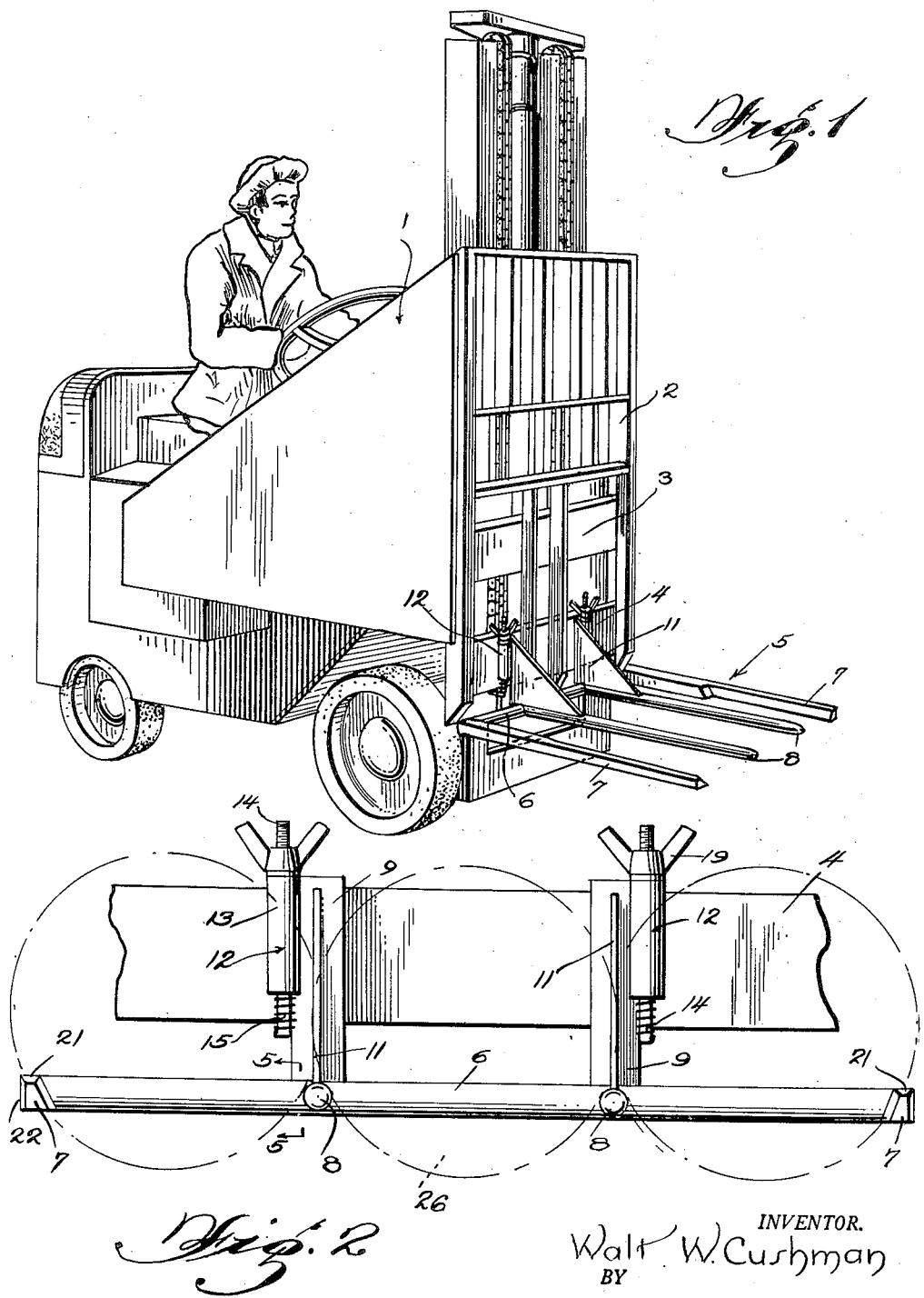

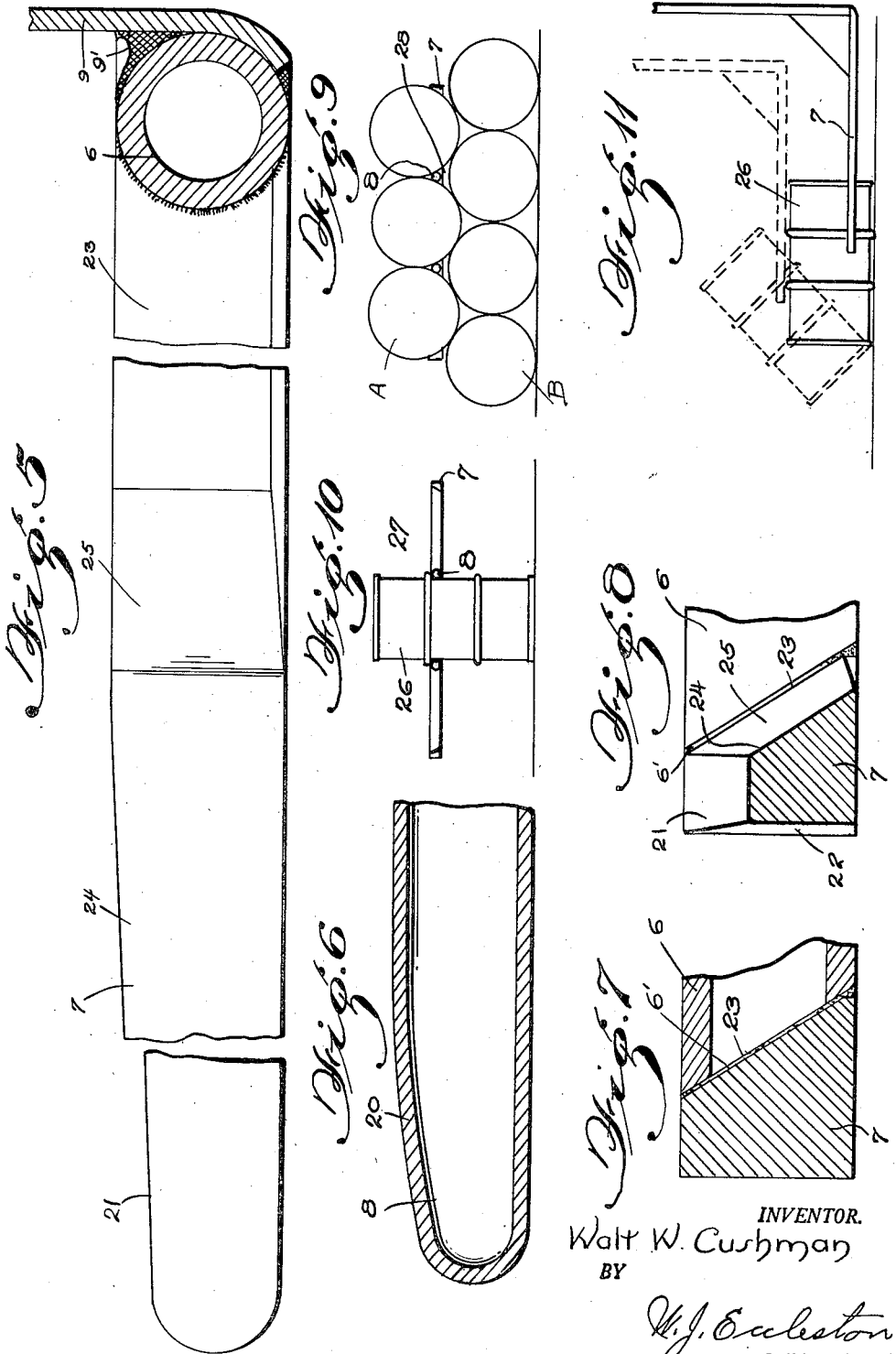

Patented Jan. 8, 1952

2,581,364

UNITED STATES PATENT OFFICE 2,581,364

DRUM-HANDLING ATTACHMENT FOR INDUSTRIAL TRUCKS

Walton W. Cushman, Webb City, Mo.

Application August 2, 1946, Serial No. 687,859

2 Claims. (Cl. 214—113)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a drum-handling industrial truck and to a method of handling and stacking drums or similar cylindrical objects.

The handling and stacking of commercial drums and other cylindrical articles by the use of industrial means where the drums are not palletized have been difficult due primarily to the cylindrical shape of the drums which render them unwieldy. Present-day fork-lift trucks are not adapted to handle unpalletized drums and when pallets are used, they take up storage space and involve additional handling which is undesirable. Furthermore, the manual handling of such drums, when filled, is difficult due to their excessive weight, approximately five hundred pounds each. Thus, a need has arisen for an industrial truck for handling unpalletized drums for stacking and unstacking purposes in warehouses or in the open, for transporting such drums, and for loading and unloading such drums into and from vehicles. It is therefore a major object of this invention to provide a drum-handling industrial truck which will handle a plurality of unpalletized drums simultaneously for lifting, stacking, or loading purposes and which will be efficient, simple, safe in operation, and require no unusual skill to operate other than that required by a fork-lift truck operator.

It is another object of this invention to provide a drum-handling industrial truck having a plurality of forwardly extending tines adapted to support a plurality of drums in side-by-side relationship with their longitudinal axes parallel to each other and to the tines.

A further object of the invention is to provide an industrial truck having forwardly extending tines having such spacing as to support a plurality of drums in side-by-side horizontal relationship with their longitudinal axes parallel to the tines and in a plane above the plane of the tines and in which some of the tines each form a simultaneous support for two adjacent drums.

It is a still further object of the invention to provide in an industrial truck an attachment which may be readily attached to the load supporting carriage of the truck and which is provided with tines arranged to facilitate the handling of drums.

Another object of the invention is to provide a drum handling attachment for an industrial truck for handling a plurality of drums simultaneously in which the attachment is readily removable and is provided with anchoring means to securely fix the attachment on the movable carriage of an industrial truck.

It is a still further object of this invention to provide a method of lifting drums positioned horizontally side-by-side by inserting tines of a fork-lift truck lengthwise into the lower spaces adjacent the drums and then lifting the tines to engage the longitudinally extending sides of the drums below the plane of the longitudinal axes of the drums.

A further object of the invention is to provide a method of stacking drums by lifting a plurality of drums unitarily with their longitudinal axes substantially parallel to each other and horizontal, and positioning them over a row of drums, similarly positioned, and lowering the drums to be stacked unitarily to a position each for joint support by adjacent drums of the row.

Other objects and advantages of the present invention will appear in the following detailed description and particularly will be pointed out in the appended claims, reference being had to the accompanying drawings forming part of the specification and in which:

Figure 1 is a perspective view showing the drum handling industrial truck of this invention ready for operation;

Figure 2 is a front elevational view of a portion of the industrial truck showing the drum handling attachment in detail;

Figure 3 is a plan view of the drum handling attachment shown in Fig. 2;

Figure 4 is a sectional detail of the drum handling attachment taken on line 4—4 of Fig. 3;

Figure 5 is a sectional detail showing one of the outer tines taken on line 5—5 of Fig. 2;

Figure 6 is a sectional detail showing the construction of the forward end of one of the medial tines;

Figure 7 is a sectional detail through one of the outer tines taken on line 7—7 of Fig. 3;

Figure 8 is a sectional detail through one of the outer tines taken on line 8—8 of Fig. 3;

Figure 9 is a diagrammatic view illustrating the method of stacking and unstacking drums;

Figure 10 is a diagrammatic view illustrating the method of lifting a drum while vertically positioned;

Figure 11 is a diagrammatic view illustrating the method of up-ending a drum from a horizontal position; and Figure 12 is a diagrammatic view illustrating the method of lifting slightly spaced drums.

Referring to the drawings, the reference numeral 1 denotes generally an industrial truck of any conventional design having a vertically movable elevating carriage 2 of a conventional type, which carriage is formed with horizontally extending crossbars 3 and 4. To the lower crossbar 4, there is anchored a drum-handling attachment denoted generally by the reference numeral 5. As shown in detail in the drawings, the drum-handling attachment 5 is composed of a horizontally disposed tubular base member 6 having welded as at 6', or otherwise fixed thereto, a plurality of forwardly extending prongs or tines, the outer tines being denoted by reference numeral 7 and the inner tines being denoted by reference numeral 8. To base member 6 are welded as at 9', or otherwise fixed, a pair of bracket hangers 9 having a hook portion 10 at the top thereof, shown in Figure 4, for hanging the drum-handling attachment on the crossbar 4 of the elevating carriage 2 of the truck 1. To further strengthen the structure of the drum-handling attachment 5, there are provided gussets or web plates 11 permanently affixed as by welding, or other suitable means, to the hangers 9, the base member 6, and the inner or medial tines 8.

In order to lock the drum-handling attachment in position on crossbar 4 of the truck, there is provided a locking device, denoted generally by reference numeral 12, associated with each of the hangers 9. As shown in detail in Figures 2 and 4, each locking device 12 consists of a sleeve 13, welded or otherwise suitably secured to each of the hangers 9, which sleeve guides a hook-shaped bolt 14 passing therethrough. The hook-shaped bolt 14 is free to rotate about the axis of sleeve 13 and is freely slidable longitudinally therein. A coil spring 15, having its upper end 16, Figure 4, abutting the side of hanger 9 and beneath sleeve 13, and its lower end 17 abutting the lower end of hook-shaped bolt 14, tends to urge the hook-shaped bolt downwardly while at the same time tends to urge the hook-shaped bolt to pivot about the axis of sleeve 13 outwardly and forwardly away from the bracket hanger 9. The hook-shaped bolt 14 is further provided with a hook end 18 adapted to engage under the lower surface of cross bar 4 to lock the drum-handling attachment 5 in position in conjunction with the hook portion 10 of hanger 9. A winged-nut 19 is threaded on to hook-shaped bolt 14 to lock the parts in position as shown in Figures 2 and 4.

To attach the drum-handling attachment 5 to the crossbar 4 of the vertically movable carriage 2, it is merely necessary to position the attachment 5 with the hook 10 over the crossbar 4, to manually turn the hook-shaped bolt 14 to a position in a plane substantially parallel to the vertical planes of the tines 8, and then to turn wing nut 19 to carry the hook-shaped bolt 14 upwardly against the spring 15 until crossbar 4 is tightly gripped between the hooks 10 and 18 in a vice-like manner. To remove the attachment 5 from the truck, it is merely necessary to loosen wingnut 19 permitting spring 15 to force the hook-shaped bolt 14 downwardly until the upper portion of the hook 18 reaches a point below the lower end of crossbar 4, at which point the coil spring 15 will pivot the hook-shaped bolt 14 outwardly and forwardly away from crossbar 4, thus permitting the hook 10, and thereby the attachment, to be manually lifted directly from the crossbar 4.

Each of the inner tines or prongs 8 is preferably of hollow construction to decrease the weight of the attachment and has its forward end tapered downwardly as at 20, clearly shown in Fig. 6, the taper being obtained by any suitable means. The outer tines or prongs 7 have their top surfaces 21 tapered downwardly slightly and their outer surfaces 22 tapered inwardly slightly in a forward direction. The inner surface of each of the outer tines 7, as shown in Figures 3, 7, and 8, is provided with the surfaces 23 and 24, separated by the surface 25 which tapers sharply outwardly in a forward direction. In effect, the forward end of each of the outer tines 7 is cut-out as at 24 such that the tine is thicker at its rear portion and thinner at its front portion, for a purpose to be described hereinafter. The inner surfaces 23, 24, and 25 slope downwardly and inwardly, as clearly shown in Figures 7 and 8, and the surfaces 23 and 24 lie in planes parallel to the longitudinal axes of the tines.

The tines 7 and 8 are spaced apart at such a distance as to be adapted to support therebetween, in a cradled manner, a plurality of standard commercial drums 26, shown by dotted lines in Figures 2 and 3, with the longitudinal axes of the drums substantially horizontal and parallel to the tines and with the tines engaging the longitudinally extending sides of the drums substantially in a plane below the plane of the longitudinal axes of the drums. Furthermore, the dimensions of the tines are such that the inner tines 8 will each form a support for two adjacent drums, as clearly shown in Figure 2, while the outer tines will aid in supporting the outer drums. The outer tines 7 will be positioned within the confines of the drums in a transverse direction so that the minimum overall width of the drums will be greater than the overall width of the tine area. With this arrangement, the limiting dimensions for maneuverability of the loaded tines is determined not by the width of the tine area but by the overall drum width. In practice, the minimum overall width of the drums in loaded position should be preferably less than six feet, which is the approximate width of a standard freight car door, to make easy loading or unloading through car doors. However, it is within the scope of this invention to arrange the tines with different dimensions depending on drum diameter and width of door openings to be encountered.

The standard commercial 55-gallon drum 26 is provided with intermediate beads 27 which in the use of the apparatus of this invention will be positioned in overlapping relationship with respect to similar beads of adjacent drums, as shown in Figure 3. The spacing of the tines is such that the beads of one drum will contact the longitudinally extending side of an adjacent drum in order to position the drums to present their minimum overall width. As can be seen in Figure 3, the narrow forward portion of each of the outer tines 7, defined by the cutout, at surface 24, is adapted to accommodate the intermediate beads 27.

In use, in lifting a set of drums, positioned side-by-side with their longitudinal axes substantially parallel to each other and lying in a substantially horizontal plane, it is merely necessary for the truck operator to move the truck 1 towards the drums to insert the tines 7, 8 into the lower spaces 28, Figure 9, adjacent the drums to be lifted with the inner tines 8 each entering the lower space between two adjacent drums, and then upon lifting the tines, they will engage the longitudinally extending sides of the drums to lift same, and the drums may then be transported while being held in the position shown in Figure 2. If the drums are on the floor or ground and are not initially in exact parallel arrangement, as illustrated in Figure 12, the tines of this invention will still raise the drums because as the tines engage and lift some of the drums, they will cause the drums to move, roll or fall under the influence of gravity into proper cradled and contacting position between the tines. Thus, it is obvious that the drums need not contact each other prior to lifting but need merely be closely spaced so that the tines can enter simultaneously the lower spaces adjacent the drums. For example, as shown in Figure 12, as the tines 7, 8 are raised, the outer tines 7 will force the outer drums towards the center drum to properly position the drums in contacting relationship as in Figure 2.

In stacking drums, one row upon another, it is merely necessary to carry the tine-carried drums, denoted by A in Figure 9, to a position over a row of drums, denoted by B in Figure 9, with the drums A offset from the drums B a distance approximating the drum radius, and then by lowering the tines, the drums A will be lowered to a position for joint support by adjacent drums B of the row. If the drums A are not offset exactly a drum radius from drums B, they will still roll into proper position when the tines are lowered. To unstack drums, it is merely necessary to insert the tines into the spaces 28 between the drums A and lift the drums for removal.

It is evident that with the drum-handling attachment of this invention, which may be applied to a conventional industrial truck, it is possible to handle a plurality of drums simultaneously for stacking and unstacking and for loading into and from freight cars. Since the industrial truck affords both vertical and horizontal movement, it is obvious that stacking may be accomplished to form several rows of drums, one row on another, the height of the stack being limited only by the height to which the carriage 2 can be elevated. With this apparatus, stacking can even be accomplished within a freight car, since the tines 7 and 8 can be moved through the door opening of a freight car for stacking rows within the car.

Though the attachment is shown as being secured to the lower crossbar 4, it may be secured to the other crossbar 3, or otherwise.

It is apparent that the drum-handling attachment 5 of this invention may be expeditiously and securely fastened in position on an industrial truck and without the use of any special tools. Only a manual operation is required to hang and lock the attachment in position. Also, it is to be noted that the attachment 5 can be quickly removed, when desired, by merely loosening the wingnuts 19 and lifting off the attachment.

Though the drum-handling attachment illustrated is provided with four tines for handling three drums simultaneously, it is obviously within the scope of the invention to provide for a greater or lesser number of tines so as to handle a greater or lesser number of drums.

The tines 7 and 8 of the drum attachment 5 of this invention are further so dimensioned and spaced as to lift a drum 26 with its longitudinally extending axis vertically arranged, as illustrated diagrammatically in Figure 10. When the attachment is used in this manner, the tines 7 and 8 are adapted to be moved in a position beneath the beads 27 of the drum so that when the drum is lifted the load of the drum is transmitted through the beads 27 to the tines. Figure 10 only illustrates one drum about to be lifted, but it is obvious that a plurality of vertically arranged drums can be lifted simultaneously between the several tines.

Furthermore, the attachment of this invention lends itself to another function, as illustrated in Figure 11, i. e., the function of up-ending a drum from a horizontal position to a vertical position. In this illustration, the tines and drums are shown in full lines at the start of operation and by dotted lines in a position with the up-ending operation partially completed.

It is further obvious that this invention embodies an improved method of handling a plurality of drums simultaneously or unitarily without the use of pallets whereby a plurality of drums may be lifted simultaneously by a plurality of tines engaging the longitudinally extending sides of the drums so that the drums are cradled between the tines with their longitudinal axes parallel to each other and substantially horizontal. This method of handling drums unitarily permits expeditious stacking of drums in rows or unstacking of drums, with the drums in alignment at all times. The elimination of pallets enables the drums to be stacked economically with a minimum of steps into rows of drums with the drums of adjacent rows staggered in a transverse direction a distance approximating the radius of a drum whereby each drum is adapted to be nested between and simultaneously supported by a pair of drums in a lower row. It is evident that in the method of this invention, drums slightly out of line will be automatically forced into aligned position under the influence of gravity when the drums are lifted, as illustrated in Figure 12, and without any additional steps. Thus, the drums will automatically assume a contacting and aligned relationship and present a minimum overall width on the attachment 5 so as to facilitate passage of the drums into and out of a door opening of prescribed width.

While the invention has been described in more or less detail, it is not to be limited thereby, as changes may be made in the form, arrangement, and construction of parts, and equivalents may be substituted, without departing from the spirit and scope of the invention as claimed, the form hereinbefore described being merely a preferred embodiment thereof.

I claim:

1. A drum-handling attachment for an industrial truck having a vertically-movable carriage provided with a crossbar, comprising a horizontally disposed base member, a plurality of forwardly extending tines secured to and extending normally of the base member, a pair of bracket hangers each having a hook portion at the upper end thereof, said bracket hangers being fixedly secured to the base member and extending upwardly therefrom with said hook portions extending rearwardly and adapted to engage over the crossbar, a pair of sleeves fixedly secured to said hangers, hook-shaped bolts each having one arm slidably mounted in a sleeve leaving the other arm free to engage about the lower edge of the crossbar, coil springs encircling a portion of each of the first-mentioned arms and adapted to press said hook-shaped bolts downwardly and rotate them about the axis of said sleeves, and means for drawing said hook-shaped bolts into engagement with the lower edge of said crossbar against the pressure of said springs.

2. An attachment for handling drums provided with rolling hoops or beads and adapted to be attached to an industrial truck, comprising a base member, at least three tines extending normally thereto and adapted to support at least two drums, said tines being spaced from each other a distance sufficient to adapt the same to engage the rolling hoops in a plane somewhat below the longitudinal center lines of said drums for supporting the same thereon in side-by-side relation, the outer of said tines being beveled inwardly and downwardly and tapered from the rear toward the front on their inner faces, said outer tines being reduced in cross-sectional area in their forward portions to provide forwardly directed shoulders, and means for securing said attachment to the carriage of an industrial truck.

WALT W. CUSHMAN.

REFERENCES CITED

The following references are of record in the file of this patent:

UNITED STATES PATENTS

| Number | Name | Date |
| --- | --- | --- |
| 199,975 | Hayes | Feb. 5, 1878 |
| 632,381 | Theodore | Sept. 5, 1899 |
| 1,280,013 | Goddard | Sept. 24, 1918 |
| 1,460,283 | Shutsa | June 26, 1923 |
| 1,835,431 | Ryerson | Dec. 8, 1931 |
| 1,853,383 | Sneed | Apr. 12, 1932 |
| 2,058,397 | Baker | Oct. 27, 1936 |
| 2,061,495 | Woodruff | Nov. 17, 1936 |
| 2,178,369 | Dunham | Oct. 31, 1939 |
| 2,181,357 | Chipman | Nov. 28, 1939 |
| 2,239,135 | Wehr | Apr. 22, 1941 |
| 2,341,048 | Kopp | Feb. 8, 1944 |
| 2,368,122 | Dunham | Jan. 30, 1945 |
| 2,386,759 | Ulm | Oct. 16, 1945 |
| 2,413,661 | Stokes | Dec. 31, 1946 |
| 2,427,301 | Puim | Sept. 9, 1947 |
| 2,441,750 | Britton | May 18, 1948 |